Nov. 11, 1969     E. W. HOWE     3,477,298

GYROSCOPIC APPARATUS AND SYSTEMS

Filed Aug. 17, 1966     2 Sheets-Sheet 1

INVENTOR:
EDWIN W. HOWE
BY Howson & Howson
ATTYS.

Nov. 11, 1969    E. W. HOWE    3,477,298
GYROSCOPIC APPARATUS AND SYSTEMS
Filed Aug. 17, 1966    2 Sheets-Sheet 2

INVENTOR:
EDWIN W. HOWE
BY Howson & Howson
ATTYS.

3,477,298
GYROSCOPIC APPARATUS AND SYSTEMS
Edwin W. Howe, North Baldwin, N.Y., assignor to AMBAC Industries, Incorporated, a corporation of New York
Filed Aug. 17, 1966, Ser. No. 572,935
Int. Cl. G01c *19/28, 19/08*
U.S. Cl. 74—5.34                    11 Claims

ABSTRACT OF THE DISCLOSURE

A two-degree-of-freedom gyro of the rotating suspension type in which control signals indicative of, deviations of the spin axis about a sensing axis normal to the spin axis are applied to produce a torque on the rotor about an axis normal to both the spin and sensing axes so as to maintain the spin axis deviation near zero. When the gyro is balanced, the control signals represent rate of rotation, when the gyro is unbalanced, the control signals represent acceleration. Sensing and torquing are preferably applied about two sets of mutually perpendicular axes to provide information as to rate and acceleration about all axes except the spin axis. Two such gyros driven from a common shaft, one balanced and one unbalanced, provide accurate information as to rate, total angle, linear acceleration and linear velocity. Torquing is preferably by equal energy pulses, and provides a convenient digital output.

---

This invention relates to gyroscopic apparatus and systems. More particularly it relates to rate gyros, to linear accelerometers employing gyros, to systems employing combinations of such rate gyros and linear accelerometer gyros, and especially to arrangements of such gyro apparatus and systems for producing information as to the motion thereof.

There are a variety of applications in which it is desirable to employ gyroscopic apparatus for the purpose of producing indications of one or more of the angular acceleration, angular rate, total accumulated angle of rotation, linear acceleration, linear velocity, and total accumulated linear distance of travel of a frame supporting the gyroscopic apparatus. A typical application is in navigation or guidance of space vehicles or missiles.

One type of known instrument employed for such purposes is the conventional single-degree of freedom rate gyro which produces indications of the angular rate, or velocity of turning in space, of a gyroscope supporting frame. In a typical form of this instrument the spinning rotor is mounted on an inner gimbal ring by means of appropriate low-friction spin bearings and the inner gimbal ring is mounted in turn on the supporting frame by means of low-friction bearings to permit angular deviation of the inner gimbal ring and the rotor spin axis about a gimbal axis normal to the gyro spin axis. A restraining spring provides a linear restoring torque which opposes rotation of the inner gimbal with respect to the supporting frame. Angular rotation of the supporting frame about an input axis normal both to the spin axis and to the gimbal axis produces a torque on the gyro rotor proportional to the angular rate of the frame, tending to precess the rotor about the gimbal axis and to produce an increasing angular displacement between the inner gimbal and the frame. However the restraining spring opposes this precession with a restraining torque proportional to the angular displacement, and when the angular displacement increases to the value for which the restraining torque is equal and opposite to the precessional torque on the rotor, the displacement angle remains fixed at a value proportional to the rate of rotation of the frame about the input axis and is used as an indication thereof. By known techniques the total angular displacement of the frame occurring in a given time, about the input axis, can be obtained.

While useful for many purposes, the above-described type of rate gyro is only capable of indicating components of angular rate about a single coordinate axis, and if such information is required for two or three axes then two or three such rate gyros, respectively, must be employed. It is also limited as to the range of angular velocities which can be indicated in practical applications, since if the spring-like restoring force is made too strong it will not be sensitive to low angular rates, while if the spring is made weak or soft it will not be possible to indicate high angular rates since the maximum deviation between the rotor spin axis and the supporting frame is restricted by practical construction difficulties and, ultimately, by severe practical difficulties if the angular displacement is 90° or more.

Also known are unbalanced-gyro integrating accelerometers which provide indications of linear velocity of a supporting frame along a predetermined direction normal to the gyro spin axis. Such devices again utilize a single-degree-of-freedom gyro the rotor of which has its spin axis mounted on bearings supported in an inner gimbal ring which is mounted for rotation about a gimbal axis normal to the spin axis, and an outer supporting frame rotatable by a motor about a second axis normal to the spin axis and to said gimbal axis. An unbalancing mass is affixed to the inner gimbal ring so that the effective center of mass of the gimbal ring and rotor combination is displaced along the spin axis from the center of suspension of the gyro rotor. Angular displacement of the inner gimbal ring about its gimbal axis is sensed, and a signal indicative thereof derived, amplified, and applied to the motor in such a polarity as to rotate the supporting frame in a direction to precess the gyro toward its original reference position with respect to the frame. Linear accelerations perpendicular to said gimbal axis and to the spin axis produce a tendency for rotation of the inner gimbal and rotor about the gimbal axis, but when the speed of the motor increases to a rate at which the precessional torque produced on the rotor by the motor equals the opposing torque due to the linear acceleration, the displacement angle between gimbal ring and supporting frame remains constant at a value proportional to the linear velocity of the frame along a direction perpendicular to the rotor spin axis and to the gimbal axis. The proportionality factor relating displacement angle to velocity includes the angular momentum H, and hence the velocity indications obtained depend on mass and angular velocity of the rotor. By known integration techniques the distance of travel of the frame during a given time can be obtained.

Again, while such unbalanced gyro integrating accelerometers have been found useful for many purposes, they are capable of providing information only with respect to components of linear velocity directed along a single sensitive axis, and if for example information is required along two or three axes then two or three such accelerometers, respectively, must be utilized.

In addition, both the rate gyro and the gyro accelerometer described above are subject to undesirable bearing restraints due to the fact that under conditions of constant output the various gyro-supporting shafts are fixed relative to their supporting bearings and, to resume motion, must start from rest against the bearing force commonly referred to as "stiction."

Other complications or drawbacks of such prior-art arrangements include a variety of problems relating to such factors as the effects of uncontrolled mass imbalance in the gyro, the effects of small but significant unbalanced torques imposed on the rotor by the construction employed, and various complications relating to the ease, accuracy and simplicity with which output signals can be derived and modified to produce the desired form of information.

It is an object of this invention to provide new and useful gyroscopic apparatus.

Another object is to provide a new and useful rate gyro and system.

A further object is to provide such a rate gyro and system which are capable of accurate operation at low angular rates and which can also be operated at high angular rates.

A further object is to provide a rate gyro system which requires only a single rotor to provide information as to angular rotation about two different mutually-perpendicular axes.

Another object is to provide such a rate gyro system in which the deleterious effects of fixed torque imposed by the rotor suspension on the rotor and of cross-coupling acting between the two sensitive axes are minimized.

A further object is to provide such a rate gyro system in which integration of rate information to produce total angle information is readily and accurately derivable.

Another object is to provide a new and useful rate gyro system in which problems of damping the gyro rotor are minimized.

It is also an object to provide a new and useful gyro accelerometer and system for producing indications of linear motion.

Another object is to provide a gyro accelerometer and system for producing indications of linear accelerations and/or velocity acting along two mutually perpendicular axes while requiring only a single rotor.

Another object is to provide such a gyro accelerometer and system in which sensitivity to accelerations along the spin axis of the gyro are minimized.

Another object is to provide such a gyro accelerometer and system in which integration to provide linear velocity information is readily and accurately obtainable.

Another object is to provide such a gyro accelerometer and system in which cross-coupling effects tending to produce spurious indications of accelerations along a given axis are minimized.

Another object is to provide such a gyro accelerometer and system in which the disturbing effects of fixed torques acting between the rotor suspension and the rotor are minimized, thereby to make possible high sensitivity to acceleration.

A further object is to provide such a gyro accelerometer and system which is operable and effective at high accelerations.

Another object is to provide a new and useful gyroscopic system comprising the combination of a two-degree-of-freedom gyro accelerometer system with a two-degree-of-freedom rate gyro system.

It is another object to provide the last-named type of combined system in which the rotors of the two gyroscopic devices are rotatable about parallel spin axes, and hence conveniently operable from a common motor for providing rotor spin.

It is also an object to provide a combined accelerometer and rate-gyro system of the latter type which is new and useful for producing complete navigational information as to angular and linear motion.

In accordance with the invention, the above and other objects are achieved by the provision of a novel gyroscopic apparatus and system now to be described generally, and later herein in detail.

As utilized herein, the term "one-degree-of-freedom" gyro refers to a gyro exhibiting angular freedom of its rotor about one axis other than the spin axis, while "two-degree-of-freedom" refers to a gyro in which the rotor exhibits angular freedom about two axes mutually perpendicular to each other and to the spin axis of the rotor; a two-degree-of-freedom is also designated as a "free gyro." The class of free gyros includes both non-rotating suspension free gyros and rotating-suspension free gyros.

Typical of the non-rotating suspension free gyros are those employing an inner gimbal ring for mounting the spinning rotor and an outer gimbal ring on which the inner gimbal ring is mounted and which in turn is mounted to an exterior supporting frame, the inner and outer gimbal rings being free to pivot simultaneously with respect to each other and wtih respect to the supporting frame about a pair of corresponding mutually-perpendicular gimbal axes, both perpendicular to the rotor spin axis. Another type of non-rotating suspension free gyro is described in Patent No. 3,107,540 of L. Curriston, issued Oct. 10, 1963, and entitled "Gyroscope Pickoff and Torquer," in which device the rotor is mounted on the exterior of a spherical ballbearing, rotated thereon by means of a detached external motor, and is able to change the angle of its spin axis simultaneously about each of two axes mutually-perpendicular to the spin axis.

Rotating-suspension free gyros include, for example, free-rotor and case-rotated types. In such gyros the suspension for the rotor is rotated substantially about the rotor spin axis, usually at the same rate as the rotor. In the free-rotor gyro of the rotataing suspension type, the gyro spin axis is free to move angularly with respect to the spin motor about axes mutually-perpendicular to the spin axis and to each other, as in the gyro described and claimed in my copending application Ser. No. 291,546, filed June 28, 1963, and entitled "Gyroscope Apparatus." Another example of the rotating-suspension free-rotor gyro is the type of gyro using an air-bearing as described and claimed in U.S. Patent No. 3,257,854 of W. Schneider, L. Curriston and J. Evans, entitled "Fluid Bearing Gyroscopes" and issued June 28, 1966. In the case-rotated rotating suspension gyro the gyro spin axis is angularly fixed with respect to the spin motor; the spin motor and rotor are commonly enclosed in a floating ball within another case which rotates substantially about the spin axis. Case-rotated gyros also include those in which the rotor is supported by conventional inner and outer gimbal rings attached at the exterior to a case which is rotatable about an axis substantially parallel to the spin axis of the rotor.

In one aspect the invention comprises a two-degree-of-freedom gyro having a gyro rotor and a suspension permittting rotation of the rotor about a spin axis with respect to a reference frame; sensing means are employed which are responsive to angular deviation of the spin axis of the rotor from a reference position with respect to the reference frame, about a sensing axis normal to the spin axis, for developing control signals which are indicative of the angular deviation of the rotor with respect to the frame. In addition, torquing means are employed which are supplied with the control signals from the sensing means and are responsive thereto for applying torque to said rotor about a torquing axis normal both to said sensing axis and said spin axis to precess said rotor in a direction such as to reduce its angular deviation from its reference position. Preferably the sensing means and torquing means embody enough gain so that the angular deviation is in fact held near zero.

Using a balanced gyro in which the center of mass and center of suspension of the spinning portions of the apparatus are coincident or displaced only at right angles to the spin axis, the above-described apparatus comprises a novel form of rate gyro in which the magnitude of the electrical control signals supplied to the torquer to maintain the rotor at or near its reference position comprise indications of the angular rate of rotation of the sensing means about the sensing axis and hence of the angular rate of rotation of the reference frame to which the sensing means are normally mounted. Using in the above apparatus an unbalanced gyro, in which the center of mass and the center of suspension of the spinning portions of gyro apparatus are displaced from each other along the spinning axis, the magnitude of the electrical signals supplied to the torquer comprise indications of the linear acceleration $a$ of the frame along a predetermined axis normal to the spin axis.

By using a first sensing means and a second sensing means each of the type described above, circumferentially spaced from each other by 90° around the spin axis, and by using corresponding first and second torquing means of the type described above, circumferentially spaced by 90° from the first and second sensing means, respectively, and by supplying the separate control signals from the two sensing means to the corresponding torquing means to produce precessional torques on the rotor about both sensing axes, the control signals supplied to the two torquers may be caused to represent the angular rate $\omega$ or the linear acceleration $a$ with respect to two different axes which are perpendicular to each other and to the spin axis. The control signals of the two torquers then provide information as to angular rate and/or linear acceleration about or along all axes except axes parallel to the spin axis. The signals representing angular rate may be integrated to produce signals indicative of the total accumulated angle $\theta$ during a predetermined time interval, and the signals representing acceleration may be integrated to produce signals indicative of the linear velocity at any time. Accordingly with such an arrangement utilizing a balanced gyro, a single gyro is sufficient to produce angular rate and/or total accumulated angle information with respect to both of two axes perpendicular to each other and to the spin axis, rather than requiring two separate gyros as in prior art single degrees of freedom gyros. Similarly, using an unbalanced gyro in the above arrangement, a single gyro is sufficient to produce signals indicative of components of linear acceleration or velocity along each of two axes perpendicular to each other and to the spin axis. Furthermore, in both the balanced and unbalanced gyro apparatus of the invention the desired information is obtained in electrical form without requiring special mechanical arrangements for accommodating substantial deviations of the rotor spin axis from its reference position with respect to the frame, since the spin axis is automatically held near its reference position.

As a preferred feature of the invention, the above-described arrangement uses a gyro of the rotating-suspension type. With such a rotating-suspension gyro, radial imbalances and fixed-torque effects arising in the rotating portion of the apparatus are, in effect, averaged out over a complete rotational cycle so as to have no net harmful effect on stability of the gyro. Because of the resultant high stability and low drift rate, the resultant gyroscopic apparatus has high inherent sensitivity, enabling it to detect and indicate accurately low angular rates and linear accelerations. Furthermore, where the rotating suspension is of the type utilizing friction bearings, the effect of rotation of the suspension is to maintain the shafts constantly in motion in their respective bearings, so that harmful effects of "stiction" are removed.

Especially advantageous operation is obtained in accordance with a further feature of the invention by combining the above-described torquing about an axis normal to a sensing axis with a particular type of rotating suspension described and claimed in my copending application Ser. No. 291,546, entitled "Gyroscope Apparatus" and filed June 28, 1963. In the latter type of gyroscopic instrument, the rotor is preferably driven about its spin axis by a driving member through an intermediate member or gimbal which is connected to the rotor by driving pivot means and connected to the driving shaft by driven pivot means, and a spring-like restoring torque is provided between the intermediate member and at least one of the driving member and the rotor, about at least one of the pivot means, when the intermediate member is angularly displaced from a reference position thereof about at least one of said pivot means. Preferably the driving member is rotated at an effective resonant speed such that precessional drift of the rotor is minimum when torquing power is zero. The resultant device is a highly-accurate rate gyro or gyro accelerometer having high sensitivity to motions to be measured but low sensitivity to radial imbalances and fixed torques in the suspension. In the system of the invention, sensitivity to acceleration along the spin axis is substantially eliminated and cross-coupling reduced to a minimum.

In accordance with a further feature of the invention, two such gyroscopic apparatuses are utilized in combination, with their spin axes substantially parallel to each other. This permits use of a single common motor for driving the two drive shafts, with resultant simplicity. Further, an especially advantageous combination is obtained when one of the gyroscopic devices is unbalanced so as to serve as a linear accelerometer while the other is balanced so as to serve as a rate gyro or free reference gyro. Such an arrangement may be utilized on a stabilized platform, or in a so-called "strapped-down" application; in the latter case the outputs of the two gyroscopic devices are preferably subtracted to obtain accurate linear velocity information free of interference from the effects of rotation of the apparatus. From the latter type of apparatus, complete navigational information as to angular rate, total accumulated angle, linear acceleration and linear velocity can be readily provided.

As a further feature of the form of the apparatus utilizing a free-rotor gyro with unbalanced rotor, adjustment of the scaling factor or proportionality constant of the gyro system may readily be accomplished by providing adjustable means for unbalancing the rotor. For example, this may be accomplished by providing one or more screws on one face of the rotor which may be adjusted to present the desired degree of unbalance along the spin axis. In this way the instrument may be adapted for sensing accelerations in various preselected ranges.

While each of the above-described forms of the invention may employ analog apparatus of mechanical or electrical form to derive and to process the signals from the sensing means, it is a further feature of the invention in one aspect that digital apparatus of special form may readily and advantageously be used for this purpose. More particularly, each torquer is preferably operated by a series of pulses of substantially equal energies but of varyingly opposite polarities, such pulses of opposite polarities having opposite effects on precession of the gyro rotor; the sensing means produces signals indicative of the direction of angular displacement of the rotor from a reference position with respect to the frame, which latter signals control the polarity of the torquer pulses so as to oppose such angular displacement of the rotor. The algebraic sum of the torquer pulses over a period of time, i.e. the net excess in the number of pulses of one polarity over the number of pulses of the opposite polarity as indicated for example by a reversible counter supplied with the varyingly opposite polarity pulses, then indicates the total accumulated angular displacement of the frame in the case of a balanced rotor or the linear velocity of the frame in the case of an unbalanced rotor arrangement. This type of apparatus may be utilized in any of the systems described above.

Other objects and features of the invention will be more fully appreciated from consideration of the following detailed description, taken in connection with the accompanying drawings, in which:

FIGURE 7 is an elevational view of a portion of the gyro of any of FIGURES 1, 5 or 6 and showing the positions of balance-adjusting screws.

Figure 1:
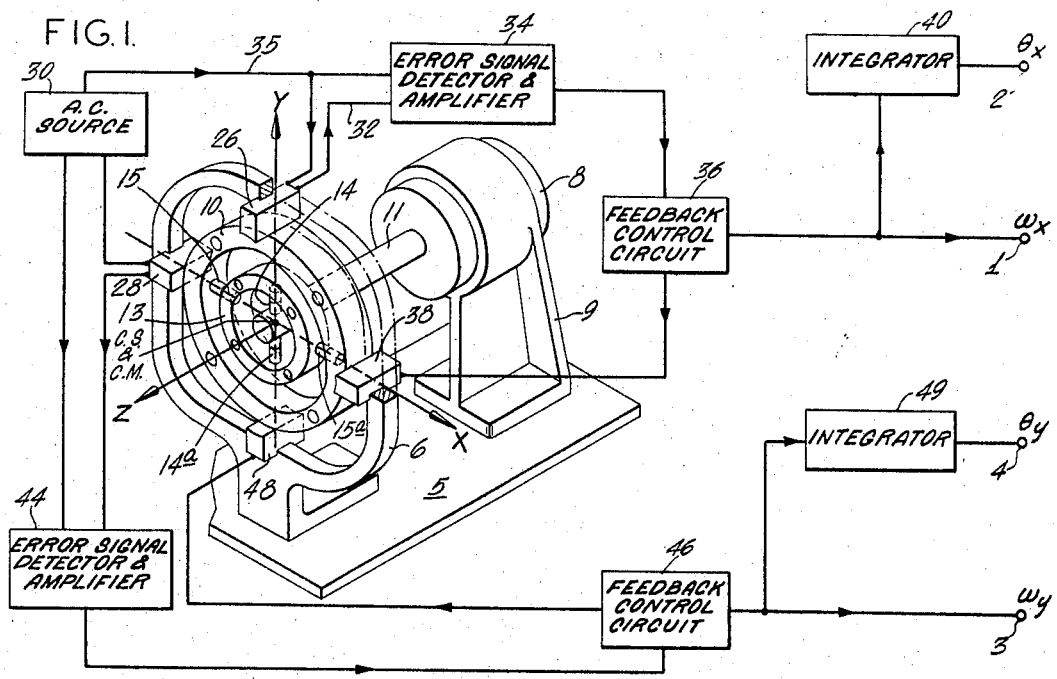
FIGURE 1 is a diagrammatic representation, partly in perspective and partly in block form, illustrating a gyro system in accordance with the invention in one form and using a balanced gyro.

Referring now particularly by way of example to the embodiment of the invention illustrated in FIGURE 1, there is shown a gyroscopic apparatus and system suitable for producing output electrical signals at output terminals 1, 2, 3 and 4 indicative of angular motion of a supporting frame 5 and the gyro-supporting yoke 6 about axes parallel to the reference axes X and Y in FIGURE 1, which axes are two of a set of three mutually-orthogonal axes X, Y and Z fixed in space. More specifically, the signals at output terminal 1 are indicative of the angular rate of rotation $\omega_x$ of frame 5 about the X axis, the signals at output terminal 2 are indicative of the total angle of rotation $\theta_X$ of frame 5 about the X axis in a preselected time interval, the signals at output terminal 3 are indicative of the angular rate of rotation $\omega_Y$ of frame 5 about the Y axis. The output signals at terminal 4 are indicative of the total accumulated angle $\theta_Y$ through which frame 5 rotates in a predetermined time interval. The signals at output terminals 1, 2, 3 and 4 may typically be supplied to a computer apparatus, control apparatus or inertial guidance equipment in a manner and for purposes which will be apparent to one skilled in the art.

Figure 2:
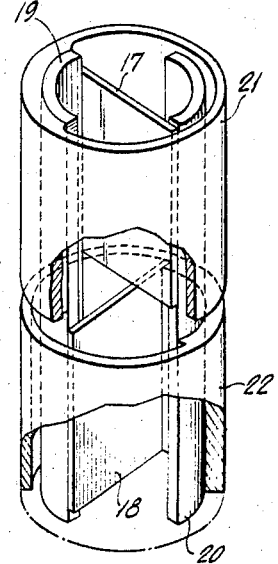
FIGURE 2 is a detail view in perspective of a preferred form of a part of the gyro of FIGURE 1.

To provide generation of the above-described output signals, there is employed a spin motor 8, mounted on a supporting mount 9 fixed to frame 5 so as to move therewith. Motor 8 serves to provide rotational driving power for the gyroscope rotor 10 through driving shaft 11, which is connected to rotor 10 by way of an intermediate gimbal ring 13. Ring 13 is secured to the driving shaft 11 by driven pivot connections 14 and 14A and secured to rotor 10 by the driving pivot connections 15 and 15A. At least the driven pivot connections 14 and 14A, and preferably also the driving pivot connections 15 and 15A, are so constructed as to provide a spring-like restoring torque about their respective axes. More particularly, each of the pivot connections 14, 14A, 15 and 15A preferably is constructed as shown in FIGURE 2, making use of a pair of crossed leaf springs 17 and 18 attached to bars 19 and 20, which bars are in turn are attached respectively to an upper cylindrical retainer 21 and a lower cylindrical retainer 22. One retainer, such as 21, is attached to one gyroscope member, such as driving shaft 11, and the other retainer, such as 22, is attached to the adjacent member of the gyroscope, such as intermediate gimbal ring 13.

The portion of the apparatus of FIGURE 1 thus far described may be substantially identical with the dynamically-tuned gyroscope described in detail and claimed in my copending application Ser. No. 291,546, now Patent No. 3,301,073 entitled "Gyroscope Apparatus" and filed June 28, 1963, and is preferably of the form described in particular connection with FIGURE 1 of the latter copending application. In view of the detailed description of the construction and operation of this form of gyroscope in said copending application, which is included herein by reference, it is not necessary to describe such a gyroscope in detail herein.

It will be convenient also to refer herein to a set of mutually-orthogonal axes x, y and z fixed with respect to frame 5 and assumed initially to be aligned respectively with the space-fixed axes X, Y and Z. In general, the type of gyroscope shown in FIGURE 1 and described in detail in said copending application has the characteristic that its rotor 10 acts as a free rotor, without any substantial restraints thereon, when it is rotated by driving shaft 11 about its spin axis at a particular effective resonant speed, even when its spin axis is angularly displaced from its reference position along the z axis by substantial amounts, about either or both of the x and y axes.

In the present example the gyro arrangement is balanced so that its center of suspension CS and center of mass CM are substantially coincident. Accordingly the gyro is not sensitive to linear accelerations acting thereon in this example.

The type of gyro illustrated in FIGURE 1 also has the significant characteristic that since the entire suspension for rotor 10—including intermediate gimbal ring 13, pivot connections 14, 14A, 15 and 15A, and driving shaft 11—all rotates with rotor 10 about the spin axis, any radial mass imbalances in the gyro and any anomalous or asymmetrical effects exerted by the suspension on the rotor are averaged out during each cycle of rotation of the rotor, and substantially eliminated insofar as their effects in producing precessional drift of the rotor are concerned. Accordingly the rotor exhibits a high degree of stability, corresponding to a low drift rate, and yet is essentially a free rotor when spun substantially at its effective resonant speed.

Affixed to the supporting yoke 6 at 90° from each other about the periphery of rotor 10, and immediately adjacent the exterior of the rotor, are a pair of angular displacement sensing means 26 and 28. Sensing means 26 comprise a conventional gyroscope pick-off device for producing output signals indicative of the sense and magnitude of angular displacement of rotor 10 with respect to the pick-off about a sensing axis coincident with the x axis, while sensing means 28 may have a similar form and are effective to produce output signals indicative of displacement of the rotor about a sensing axis coincident with the y axis. While any of a variety of sensing means may be utilized for this purpose, it is preferred to use the well-known E-type pick-off in which a plurality of coils supplied with alternating current are disposed adjacent a rotor of magnetic material, such as steel, in such manner that when the rotor 10 is in a reference position the AC signals in the coils substantially cancel each other, producing a substantially zero output signal; as the spin axis of the rotor is angularly disposed from its reference position about either of the sensing axes in a first sense, increasing alternating output signal of a given phase relation to the supplied AC voltage is produced, and as the spin axis is angularly displaced in an opposite sense from its reference position an increasing alternating output signal of a phase opposite to said first phase is produced. These changes in output signal amplitude and phase are due to the effect of motion of the magnetic rotor in changing the magnetic reluctance adjacent the sensing coils.

Accordingly, the pick-off 26 is supplied with an input alternating current from AC source 30, and its output supplied over line 32 to one input terminal of error signal detector and amplifier 34; the original reference signal is also supplied from AC source 30 to another input terminal of error signal detector and amplifier 34 by way of line 35. The error signal detector and amplifier 34 provides suitable gain for signals supplied thereto and acts as a phase detector to produce an output voltage having a polarity dependent upon the relative phase of the two input signals thereto and a magnitude dependent upon the magnitude of the output signal of pick-off 26.

More particularly, error signal detector and amplifier 34 produces a zero output voltage when the spin axis of rotor 10 is aligned in a reference position with respect to yoke 6 along a z axis perpendicular to the x and y axes, an increasing voltage of a first polarity, such as positive, when the spin axis of the rotor rotates in one sense about the x axis to move the rim of rotor 10 from its reference position with respect to pick-off 26, and an increasing voltage of the opposite polarity when the spin axis rotates in the opposite sense about the x axis to move the rim of rotor 10 with respect to pick-off 26.

Feedback control circuit 36 is supplied with the output signals from error signal detector and amplifier 34, and serves to supply torquer 38 with control signals for urging the rotor back toward its reference position with respect to pick-off 26 thus providing a null-servo action. Various types of torquers suitable for such purposes are known in the art. Torquer 38 is located at 90° around the periphery of rotor 10 from pick-off 26, and the gain of the servo loop is sufficiently high that only a very small misalignment between rotor 10 and pick-off 26 occurs despite large angles of rotation of frame 5 in space. The magnitude and polarity of the signal applied to torquer 38 by feedback control circuit 36 are a measure of the angular rate $\omega_X$ at which the rotor 10, and hence the frame 5, rotates about the X axis in space. Accordingly the latter voltage is supplied to output terminal 1 as an indication of $\omega_X$. An integrator 40, which may be of conventional analog form for example, is also supplied with the voltage from feedback control circuits 36 and produces at output terminal 2 a signal indicative of the integral of $\omega_X$, namely $\theta_X$, which represents the amount of angle through which the frame has rotated about the X axis in any selected time interval.

Pick-off 28 may be identical with pick-off 26 but, being disposed 90° around rotor 10 from pick-off 26 and 180° from torquer 38, it is sensitive to relative angular motion of the gyro spin axis about the y axis. Accordingly pick-off 28 is supplied with the reference alternating current from source 30 and produces an output signal to error signal detector and amplifier 44 having a magnitude indicative of the magnitude of angular displacement of the gyro spin axis about the y axis and a phase indicative of the sense of such angular displacement. The latter output signal and the reference signal from AC source 30 are supplied to error signal detector and amplifier 44, which may be like error signal detector and amplifier 34. The output of error signal detector and amplifier 44 then has a magnitude and polarity indicative of the magnitude and sense of angular displacement of the gyro spin axis about the y axis. The latter signal is applied through feedback control circuit 46 to torquer 48 disposed on yoke 6 180° from pick-off 26, to oppose and minimize rotor displacements around the y axis by servo action. The output of feedback control circuit 46 is also supplied to output terminal 3 to represent the angular rate of rotation about the Y axis, and, by way of an integrator 49 which may be of conventional analog form, to output terminal 4 to provide at the latter terminal a signal indicative of the total accumulated angle $\theta_Y$ of displacement of the gyro spin axis about the Y axis.

In this manner the desired signals are provided at output terminals 1, 2, 3 and 4 representative of $\omega_X$, $\theta_X$, $\omega_Y$ and $\theta_Y$, respectively, while using only a single gyro.

Figure 3:
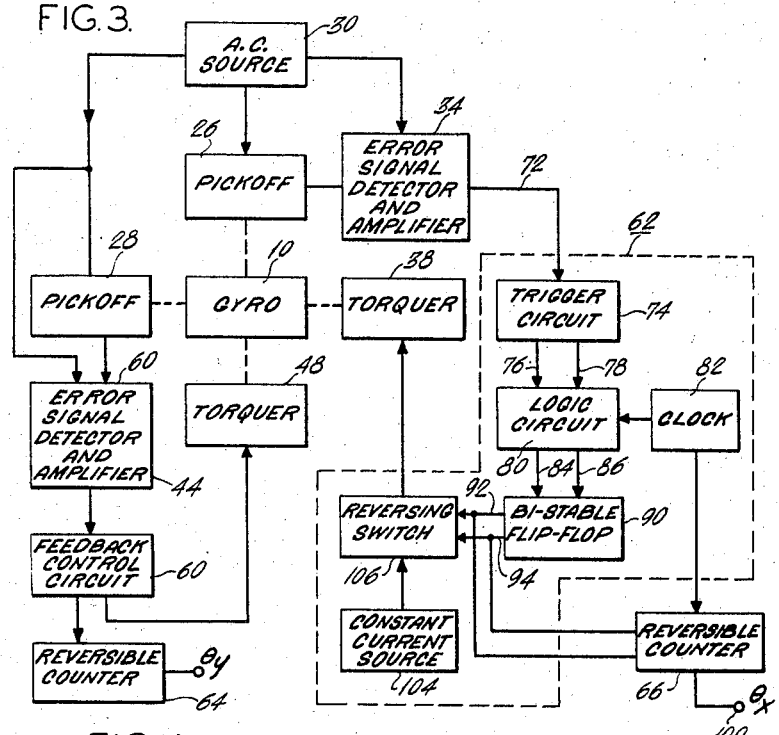
FIGURE 3 is a block diagram illustrating a preferred form of digital electrical apparatus for use in the system of the invention.

The electrical system connected to the gyro of FIGURE 1 and generally described above may be, and preferably is, of a type employing digital circuitry, as shown in FIGURE 3. In FIGURE 3 the gyro elements are represented in block form and are designated by numerals the same as those used for corresponding parts in FIGURE 1. Thus gyro rotor 10, pick-offs 26 and 28, error signal detectors and amplifiers 34 and 44, AC source 30 and torquers 38 and 48 of FIGURE 3 are the same as in FIGURE 1. AC source 30 again provides a reference alternating current to pick-offs 26 and 28, and to error signal detector and amplifiers 34 and 44; pick-offs 28 and 26 also supply output signals to the feedback control circuits 60 and 62, respectively. Feedback control circuit 60 supplies torquer control signals to torquer 48 and output signals to a reversible counter 64, while feedback control circuit 62 supplies torquer control signals to torquer 38 and output signals to reversible counter 66. It will be understood that the feedback control circuit 60 is the same as that shown in detail as feedback control circuit 62. Accordingly the construction and operation of only feedback control circuit 62 will be described in detail.

More particularly, error signal detector and amplifier 34, supplied with the pick-off signal from pick-off 26 and with the reference signal from AC source 30, produces at its output lead 72 a signal which is positive for one sense of angular displacement of the rotor spin axis about the x axis and is negative for angular displacements of the opposite sense. Error signal detector and amplifier 34 may be like that described previously in connection with FIGURE 1.

Feedback control circuit 62 includes trigger circuit 74, which is supplied with signals by output lead 72 and responds thereto to produce an output signal on its output lead 76 when the output from error signal detector and amplifier 34 is positive, and to produce an output signal at its output lead 78 only when the output signal of error signal detector and amplifier 34 is negative. Such trigger circuits are well known in the art.

The trigger circuit output signals on leads 76 and 78 are supplied to logic circuit 80, which is also supplied with a continuous train of clock pulses of uniform duration and frequency from a clock 82. Logic circuit 80 responds to the signals from trigger circuit 74 and clock 82 to produce a triggering or "set" pulse on output line 84 upon the coincidence of a clock pulse and a signal on trigger circuit output line 76; and responds to the coincidence of a clock pulse and a signal on trigger circuit output line 78 to produce a "reset" pulse on output line 86. Circuits for producing the described operation of logic circuit 70 are well known in the art.

Bistable flip-flop 90 is supplied at its two control terminals by logic-circuit output lines 84 and 86 and responds to a "set" pulse on line 84 to assume one of its bistable conditions, in which it remains until reset to its previous bistable condition by a signal occurring on logic signal output line 86. When in its "set" condition, bistable flip-flop 90 produces an output signal on its "Add" output line 92, and when in its "reset" condition produces an output signal on its "subtract" output line 94.

Flip-flop output lines 92 and 94 are connected to the count-direction control input terminals of reversible counter 66, which is supplied at its pulse-counting input terminal with clock pulses from clock 82. Reversible counter 66 provides at its output terminal 100 a signal representative of the count of clock pulses accumulated in reversible counter 66. When an output signal occurs at the "Add" output line 92 of flip-flop 90, counter 66 adds clock pulses, i.e. counts them in a positively increasing sense; when a signal occurs at the "subtract" output line 94 of flip-flop 90, counter 66 subtracts clock pulses, i.e. reduces its count.

Torquer 38 is supplied with torquing current from a constant-current source 104 by way of a reversing switch 106. Constant-current source 104 applies a constant magnitude of current to torquer 38 substantially continuously, but the direction of the current is reversed depending upon whether a signal appears at flip-flop output line 92 or flip-flop output line 94. The current through torquer 38 acts in the usual manner to precess the gyro rotor in one direction for one polarity of torquer current and in the opposite direction for the opposite direction of torquer current.

The magnitude of the torquer current is such that, if continuously applied in the same direction, the resulting gyro precession would be at least as great as the designed maximum sensing capability of the gyro.

In the operation of the arrangement of FIGURE 3, assuming first that the gyro rotor is displaced in a first sense about the *x* axis, the error signal detector and amplifier 34 will produce a corresponding positive output, which causes trigger circuit 74 to produce an output signal only on output lead 76, which in turn actuates flip-flop 90 to its "set" condition, causes reversing switch 106 to assume the condition for which the current through torquer 38 opposes the assumed rotor displacement, and causes reversible counter 66 to count clock pulses additively. When the torquer current has continued in the same direction for a sufficient length of time, the gyro rotor will be precessed to a position in which it is slightly displaced from its null position in the opposite sense from that assumed above. The error detector signal and amplifier 34 will then produce an output signal on trigger circuit lead 78 which operates flip-flop 90 to its reset position so as to operate reversing switch 106 and reverse the direction of current supplied to torquer 38 from constant-current source 104; at the same time, flip-flop 90 causes reversible counter 66 to operate subtractively, i.e. to reduce its count in response to each clock pulse.

Accordingly, since the average restoring torque being applied to the rotor to maintain it near its null position is proportional to the rate of angular motion of the frame about axis X and since the average restoring torque is proportional to the time average of the currents of opposite polarity applied to the torquer, the signal at terminal 100 produced by reversible counter 66 is proportional to the integral of the rate of turn about axis X, i.e. is proportional to the total accumulated angle of turn $\theta_X$.

Figure 4:
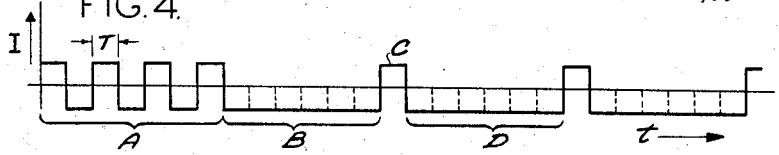
FIGURE 4 is a graphical representation to which reference will be made in describing operation of one form of the invention.

This can be more readily appreciated from reference to FIGURE 4, in which abscissae represent time and ordinates represent current through the torquer coil. The time T represents the interval between successive clock pulses. With no angular rate of turn, the torquer current may alternate back and forth in intervals of equal duration so as to exert an average net torque of about zero as represented at A of FIGURE 4. If then the frame is subjected to an angular rate of turn such that a negative current pulse having a duration equal to a plurality of clock-pulse periods (such as six shown for example at B of FIGURE 4) are required to drive the rotor back through its null position, the reversing switch 106 will remain in the position to produce such an extended negative pulse, after which there may occur a positive torquing pulse such as is shown at C. If the rate of turn continues, another long negative pulse will be produced as shown at D, and so on. From FIGURE 4 it can be seen that the average torquing current over an appreciable interval of time is equal to the difference between the number of clock pulses produced during torquing currents of one polarity and the number of clock pulses produced during torquing of the opposite polarity. Accordingly the net count in reversible counter 66 represents the average torque applied over the counting time, as desired.

Similar indication of turn about the *y*-axis is provided, in analogous manner, by feedback control circuit 60 and reversible counter 64.

Figure 5:
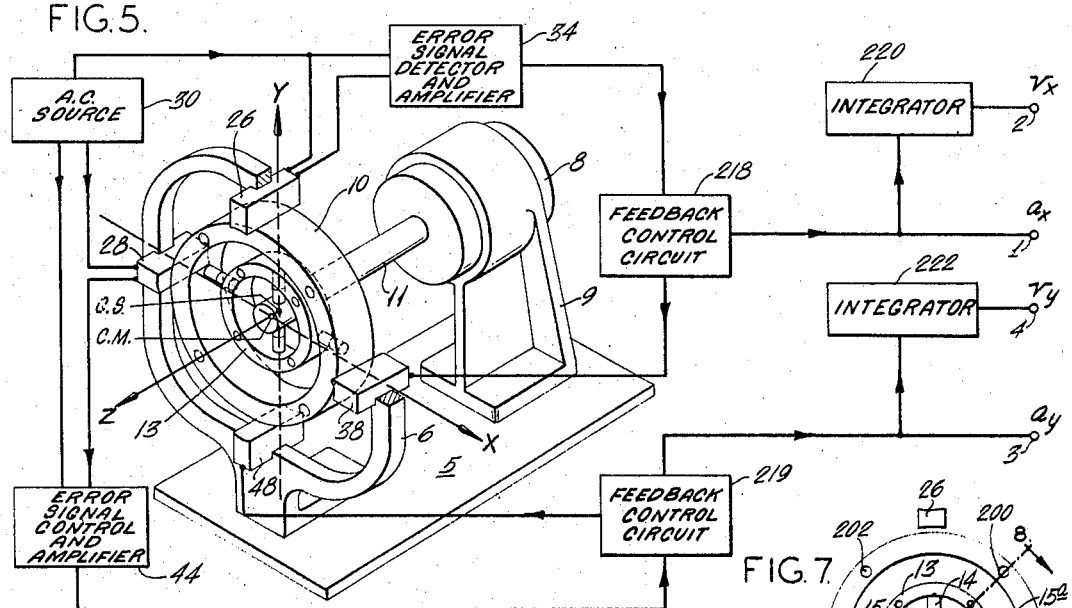
FIGURE 5 is a diagrammatic representation, partly in perspective and partly in block form, illustrating another gyro system in accordance with the invention and using an unbalanced rotor.
Figure 8:
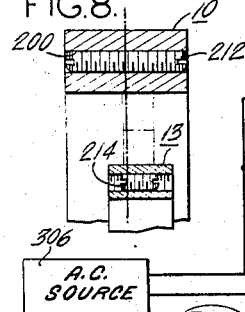
FIGURE 8 is a section of a portion of FIGURE 7, taken along lines 8—8.

FIGURE 5 illustrates a form of the invention which is essentially the same as that shown in FIGURE 1 with the important exception that the center of mass and the center of suspension are displaced from each other along the spin axis; accordingly, corresponding parts in FIGURES 1 and 5 are indicated by corresponding numerals. A fixed amount of such axial unbalance may be provided by widening the rotor 10 on one side of the center of suspension, for example by extending it somewhat forwardly along the Z axis. To obtain adjustment of the extent of such unbalance, axially adjustable slugs may be provided in the rotor. For example, as shown in FIGURES 7 and 8 particularly, four quadrature-spaced tapped holes 200, 202, 204 and 206 may be provided through the rotor 10 parallel to the spin axis, and adjustable threaded slugs such as 212 provided in each of the tapped holes. By adjusting the axial position of the slugs such as 212, the degree of unbalance of the rotor 10 with respect to the center of suspension can be adjusted. FIGURES 7 and 8 also illustrate the use of four quadrature-spaced threaded slugs such as 214 extending axially through the intermediate ring 13. These latter slugs not only permit adjustment of the balance of the intermediate ring 13 with respect to the center of suspension but also, by enabling substitution of slugs 214 of different length, provide a convenient way of adjusting the mass of the intermediate ring 13 thereby to adjust the effective resonant frequency of the gyro.

Because of the above-described displacement of center of mass and center of suspension in the embodiment of the invention shown in FIGURE 5, components of linear acceleration of the frame 5 along the X axis apply a torque to the rotor 10 about the Y axis, causing the rotor 10 to precess about the X axis. This angular motion is detected by the pick-off 26. The pick-off signal is supplied to error signal detector and amplifier 34 where it is compared with the reference signal from AC source 30. The output of error signal detector and amplifier 34 which is passed through feedback control circuit 218 to torquer 38 to apply a torque to the rotor 10 about the Y axis so as to oppose the above-described acceleration-produced torque about the Y axis. The gain of the electrical circuitry is preferably sufficient to hold the acceleration produced displacement of rotor 10 about the Y axis to a very small angle.

A similar arrangement is provided with respect to accelerations along the Y axis. More particularly, such acceleration components product a torque on rotor 10 about the X axis, which tend to precess the rotor 10 about the Y axis; however, pick-off 28 senses any such rotation about the Y axis and applies a signal by way of error signal detector and amplifier 44 and feedback control circuit 219 to torquer 48 in a polarity to oppose and minimize any such angular displacement.

Accordingly, again the rotor 10 is held near its null position by the combined action of the two servo loops, despite linear acceleration components along the X and Y axes; and the magnitudes of the signal applied to the torquers to maintain this condition are indicative of the magnitudes of the applied components of acceleration along the X and Y axes. Thus the signal from feedback control circuit 218 applied to output terminal 1 therefore represents the acceleration of frame 5 along the X axis and the output signal applied to output terminal 3 supplied from feedback control circuit 219 represents the acceleration $a_y$ along the Y axis of frame 5. A suitable integrator 220 connected between feedback control circuit 218 and output terminal 2 provides at the latter terminal a voltage representative of the velocity of frame 5 along the X axis. Integrator 222, connected between an output of feedback control circuit 219 and output terminal 4, then provides at the latter terminal a voltage indicative of the velocity $v_y$ of frame 5 along the Y axis.

In FIGURE 5, as in the arrangement of FIGURE 1, the feedback control circuitry and the integrators may be of conventional analog form, but preferably may take the form of the digital elements and reversible counters illustrated in FIGURE 3.

The sensitivity of the gyro accelerometer of FIGURE 5 depends upon the extent of the unbalance, i.e. on the displacement along the spin axis of the center of mass and center of suspension, the greater the unbalance the greater the sensitivity.

Figure 6:
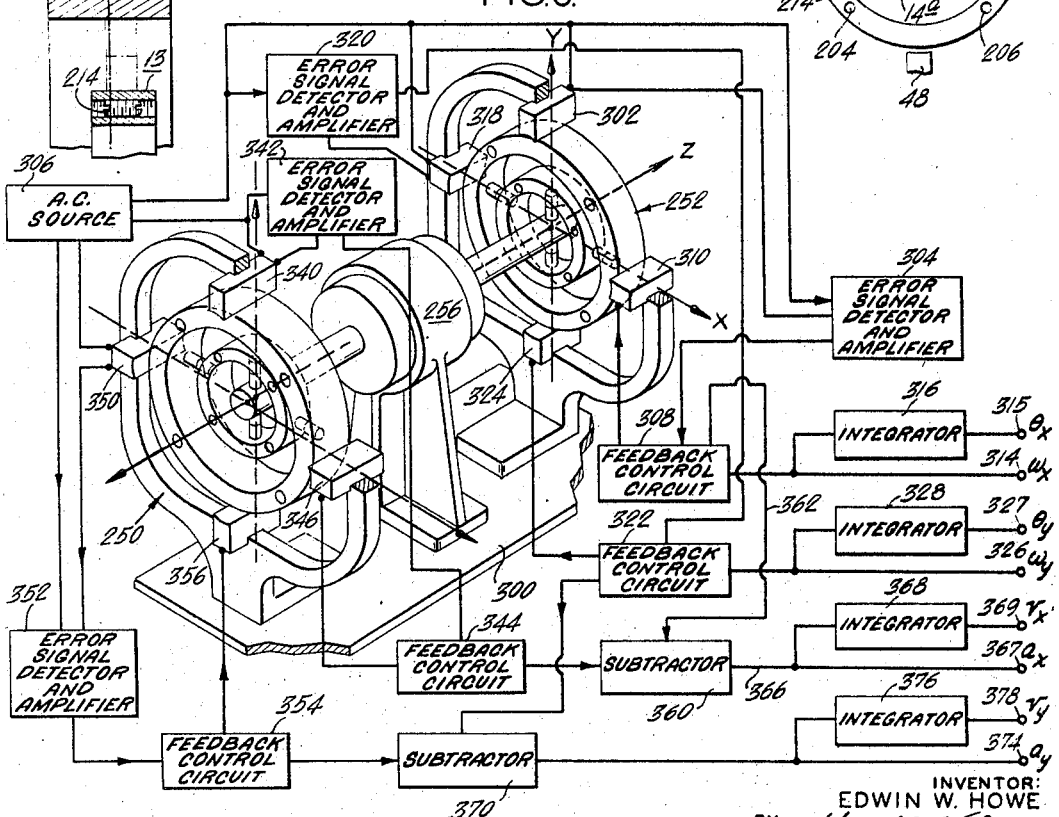
FIGURE 6 is a diagrammatic representation, partly in perspective and partly in block form, illustrating another form of the invention using both a balanced gyro and an unbalanced gyro.

FIGURE 6 illustrates an embodiment of the invention utilizing the combination of one unbalanced gyro 250 of the type described in connection with FIGURE 5, and one balanced gyro 252 of the type described in connection with FIGURE 1, driven by a common spin motor 256 to detect linear accelerations along, and rotation about, the X and Y axes. Unbalanced gyro 250 acts as a device for detecting linear accelerations along the X and Y directions while gyro 252 serves as a device for detecting angular rate of turn around the X and Y axes. The system of FIGURE 6 is adapted for use in applications in which the frame 300 to which gyros 250 and 252 are mounted may be subject to both linear accelerations and angular rotations. Because the gyro 250 intended to measure linear accelerations is then also responsive to rotation of frame 300, the system of FIGURE 6 utilizes the output derived from the angular-rate detecting gyro 252 to cancel from the uncorrected output of linear-acceleration detecting gyro 250 the undesired effects of rotation on the output signal of the linear acceleration detecting system.

More particularly, rate gyro 252 is provided with two pick-off, torquing and feedback arrangements which may be like those described with reference to FIGURES 1 and 3. In the form shown, a pick-off 302 is provided for sensing angular deviation about the X axis, and supplies output signals to error signal detector and amplifier 304, which is also supplied with a reference signal from AC source 306. The output of error signal detector and amplifier 304 is supplier to feedback control circuit 308, and thence to torquer 310 spaced by 90° from pick-off 302 about the nominal spin axis of gyro 252, the arrangement and polarity of signals being such that torquer 310 opposes and maintains near zero those deviations sensed by pick-off 302. One output of feedback control circuits 308 may be supplied to an output terminal 314 to provide an output signal indicative of rate of turn $\omega_x$ about the X axis, and to another output terminal 315 by way of a suitable integrator 316 to produce $\theta_x$ information signals.

A corresponding pick-off 318 for sensing angular deviation about the Y axis supplies signals by way of error signal detector and amplifier 320 and feedback control circuit 322 to torquer 324 to oppose tendencies for rotor deviation about the Y axis. One output of feedback control circuit 322 may be supplied to output terminal 326 as an indication of the rate of turn $\omega_y$ about the Y axis, and to another output terminal 327 by way of a suitable integrator 328 to provide $\theta_y$ information.

The arrangement of gyro 250 may be like that shown in FIGURE 5, utilizing a first feedback loop comprising pick-off 340, error signal detector and amplifier 342 supplied with a reference signal from AC source 306, feedback control circuit 344 and torquer 346, all for sensing and opposing tendencies for the rotor of gyro 250 to deviate angularly about the X axis. Also preferably employed are a second feedback loop comprising pick-off 350, error signal detector and amplifier 352, feedback control circuit 354 and torquer 356 for sensing and minimizing angular deviations of the rotor of gyro 250 about the Y axis.

The output signal from feedback control circuit 344 is also supplied to a subtractor 360, which operates to subtract therefrom an output signal from feedback control circuit 308 supplied over line 362. Since the input signal to subtractor 360 from feedback control circuit 344 has a value representing the sum of the effects of both angular rate and linear acceleration of frame 300 on gyro 250, while the output of feedback control circuit 308 varies in accordance with only the angular rate of frame 300, the output of subtractor 360 at lead 366 represents only the linear acceleration $a_x$ of frame 300, as desired. The signal at lead 366 is supplied directly to an output terminal 367 as an indication of accelerations $a_x$ about the X axis, and is also passed through an integrator 368 to another output terminal 369 to provide an indication of velocity $v_x$ along the X axis.

Similarly, another subtractor 370 is supplied with output signals from feedback control circuit 354 and from feedback control circuit 322, so as to cancel from the output signal of feedback control circuit 354 that component due to angular rotation of frame 300 about the y axis. The output of subtractor 370 may be supplied directly to an output terminal 374 to provide an indication of linear accelerations $a_y$ along the y axis, and by way of an integrator 376 to another output terminal 378 to provide an output indication of velocity $v_y$ along the y axis.

Since both gyros 250 and 252 are driven from a common shaft of motor 256, each of the gyros should be "tuned" to the same effective resonant speed so as to minimize precessional drift in both gyros simultaneously. This can be accomplished, for example, by substituting different lengths of slugs 214 shown in FIGURES 7 and 8, as described previously, until the desired operation is obtained.

It will be appreciated that forms of two-gyro systems utilizing a common motor other than that particularly shown in FIGURE 6 may be utilized in certain applications. For example, the rate gyro 252 may be replaced by an ordinary displacement gyro, in which the torquers 310 and 324 would not be utilized but, instead, the output of the feedback control circuits would be utilized to servo the frame 300 so as to mantain the rotor of gyro 252 in the same relationship with respect to the frame. Use of such stabilization of the frame would eliminate turning of the support for gyro 250 and hence eliminate from its output signal components due to angular rotation of the frame, without requiring the use of the subtractors.

The accelerometer described herein has a high degree of stability with respect to undesired fixed torques in the suspension because of the rotation of the suspension during operation. This in turn enables a low threshold, i.e. high sensitivity, for the accelerometer, the sensitivity in any particular instrument being conveniently adjustable by changing the degree of unbalance. Undesired sensitivity to accelerations along the spin axis is minimized by automatically maintaining the spin axis at or very near its reference position, and integration is made simple and convenient in the preferred embodiment, in which simple counting provides the integration.

While the invention has been described with particular reference to specific embodiments thereof in the interest of complete definiteness, it will be understood that it may be embodied in any of a variety of forms different from those specifically shown and described without departing from the scope of the invention as defined by the appended claims.

I claim:
1. Gyroscopic apparatus comprising:
a frame;
a two-degree-of-freedom gyro mounted on said frame and having a rotor and suspension means for said rotor to permit spinning of said rotor about a spin axis with respect to said frame and to permit angular displacement of said spin axis about either of two axes normal to each other and to said spin axis;
sensing means, responsive to angular displacement of said spin axis of said rotor from a reference position with respect to said sensing means, about a sensing axis normal to said spin axis, for developing control signals indicative of said displacement;
torquing means supplied with said control signals and responsive thereto to apply a torque to said rotor about a torquing axis normal both to said sensing axis and to said spin axis for opposing said displacement; and
driving means for spinning said rotor and said suspension means about said spin axis;
said suspension means comprising resilient means for permitting angularly variable offset of said driving means with respect to said rotor about an axis normal to said spin aixs.

2. Gyroscopic apparatus comprising:
a frame;
a two-degree-of-freedom gyro mounted on said frame and having a rotor and suspension means for said rotor to permit spinning of said rotor about a spin axis with respect to said frame and to permit angular displacement of said spin axis about either of two axes normal to each other and to said spin axis;

sensing means, responsive to angular displacement of said spin axis of said rotor from a reference position with respect to said sensing means, about a sensing axis normal to said spin axis, for developing control signals indicative of said displacement;

torquing means supplied with said control signals and responsive thereto to apply a torque to said rotor about a torquing axis normal both to said sensing axis and to said spin axis for opposing said displacement; and a rotatable driving member;

said suspension means comprising an intermediate member, a driven connection between said driving member and said intermediate member, a driving connection between said intermediate member and said rotor, and means providing a restoring torque between said intermediate member and at least one of said driving member and said rotor, about at least one of said connections, when said intermediate member is angularly displaced from a reference position thereof about at least one of said connections.

3. Apparatus in accordance with claim 2, comprising means for rotating said driving member at a rate for which processional drift of said rotor in the absence of said control signals is minimum.

4. Gyroscopic apparatus comprising:
a frame;
a two-degree-of-freedom gyro mounted on said frame and having a rotor and suspension means for said rotor to permit spinning of said rotor about a spin axis with respect to said frame and to permit angular displacement of said spin axis about either of two axes normal to each other and to said spin axis;
sensing means, responsive to angular displacement of said spin axis of said rotor from a reference position with respect to said sensing means, about a sensing axis normal to said spin axis, for developing control signals indicative of said displacement;
torquing means supplied with said control signals and responsive thereto to apply a torque to said rotor about a torquing axis normal both to said sensing axis and to said spin axis for opposing said displacement; and
additional sensing means responsive to angular displacement of said spin axis of said rotor from a reference position about another sensing axis, normal to said spin axis and to said first-named sensing axis, for developing control signals indicative of said last-named displacement, and additional torquing means supplied with said last-named control signals and responsive thereto to apply a torque to said rotor about a torquing axis normal to said spin axis and to said first-named torquing axis for opposing said last-named displacement.

5. Gyroscopic apparatus comprising:
a frame;
a two-degree-of-freedom gyro mounted on said frame and having a rotor and suspension means for said rotor to permit spinning of said rotor about a spin axis with respect to said frame and to permit angular displacement of said spin axis about either of two axes normal to each other and to said spin axis;
sensing means, responsive to angular displacement of said spin axis of said rotor from a reference position with respect to said sensing means, about a sensing axis normal to said spin axis, for developing control signals indicative of said displacement;
torquing means supplied with said control signals and responsive thereto to apply a torque to said rotor about a torquing axis normal both to said sensing axis and to said spin axis for opposing said displacement; and
feedback means supplied with signals from said sensing means for developing and applying to said torquing means a series of pulses of a polarity determined by the sense of said displacement of said rotor from said reference position.

6. Gyroscopic apparatus comprising:
a frame;
a two-degree-of-freedom gyro mounted on said frame and having a rotor and suspension means for said rotor to permit spinning of said rotor about a spin axis with respect to said frame and to permit angular displacement of said spin axis about either of two axes normal to each other and to said spin axis;
sensing means, responsive to angular displacement of said spin axis of said rotor from a reference position with respect to said sensing means, about a sensing axis normal to said spin axis, for developing control signals indicative of said displacement;
torquing means supplied with said control signals and responsive thereto to apply a torque to said rotor about a torquing axis normal both to said sensing axis and to said spin axis for opposing said displacement; and
said sensing means comprising means for developing and applying to said torquing means a series of periodic electrical pulses of substantially equal electrical energy whenever said angular deviation exceeds a predetermined value, the polarity of said pulses changing with the direction of said deviation from said reference position.

7. Apparatus in accordance with claim 6, comprising pulse-frequency measuring means for producing indications of the frequency of recurrence of said pulses.

8. Apparatus in accordance with claim 6, comprising pulse counting means supplied with said pulses for providing indications of the algebraic sum of said pulses applied to said torquing means starting at a reference time.

9. Gyroscopic apparatus comprising:
a frame;
a first two-degree-of-freedom gyro secured to said frame to permit spinning of the rotor of said first gyro about a first spin axis;
a second two-degree-of-freedom gyro secured to said frame to permit spinning of the rotor of said second gyro about a second spin axis;
first sensing means, responsive to angular displacement of said first spin axis from a first reference position with respect to said first sensing means, about a first sensing axis normal to said first spin axis, for developing first control signals indicative of said displacement;
first torquing means supplied with said first control signals and responsive thereto to apply a torque to said first rotor about a first torquing axis normal both to said first sensing axis and to said first spin axis for opposing said displacement thereof;
second sensing means, responsive to angular displacement of said second spin axis from a second reference position with respect to said second sensing means, about a second sensing axis normal to said second spin axis, for developing second control signals indicative of said displacement;
second torquing means supplied with said second control signals and responsive thereto to apply a torque to said second rotor about a second torquing axis normal both to said second sensing axis and to said second spin axis for opposing said displacement thereof;
said first and second spin axes being substantially parallel to each other;
said first gyro being balanced along its spin axis and said second gyro being unbalanced along its spin axis.

10. The apparatus of claim 9, comprising a common shaft member for driving the rotors of both of said first and second gyros.

11. The apparatus of claim 9, comprising means responsive to said first control signals and to said second control signals to produce an output signal indicative of linear acceleration of said frame but substantially independent of the effects or rotation of said frame.

References Cited

UNITED STATES PATENTS

| 2,527,245 | 10/1950 | Cunningham et al. | |
| 2,916,919 | 12/1959 | Echolds | 74—5.6 |
| 2,887,636 | 5/1959 | La Hue et al. | |
| 2,928,282 | 3/1960 | La Hue | 74—5.37 |
| 3,254,537 | 6/1966 | Elwell et al. | 74—5.6 |
| 3,323,378 | 6/1967 | Powell | 74—5.6 |

FOREIGN PATENTS 700,403  12/1964  Canada.

FRED C. MATTERN, JR., Primary Examiner
MANUEL ANTONAKAS, Assistant Examiner

U.S. Cl. X.R.

74—5.6, 5.7

PO-1050
(5/69)

UNITED STATES PATENT OFFICE
CERTIFICATE OF CORRECTION

Patent No. 3,477,298　　　　　　　　Dated　November 11, 1969

Inventor(s)　Edwin W. Howe

It is certified that error appears in the above-identified patent and that said Letters Patent are hereby corrected as shown below:

Column 4, line 33, for "rotataing" read --rotating--.
Column 5, line 37, for "degrees" read --degree--.
Column 8, line 48, insert --angular-- before "displacement".
Column 10, line 43, for "70" read --80--.
Column 12, line 34, for "product" read --produce--.
Column 13, line 20, for "X" read --x--; line 24, for "supplie: read --supplied--; line 32, for "X" read --x--; line 41, for "Y" read --y--; line ! for "X" read --x--; line 55, "Y" read --y· line 69, for "S" read --x--; line 71, for "X" read --x--.
Column 14, line 71, for "aixs" read --axis--.
Column 15, line 23, for "processional" read --precessional--.

SIGNED AND
SEALED

JUN 16 1970

(SEAL)
Attest:

Edward M. Fletcher, Jr.
Attesting Officer

WILLIAM E. SCHUYLER, JR.
Commissioner of Patents